United States Patent Office 3,414,810
Patented Dec. 3, 1968

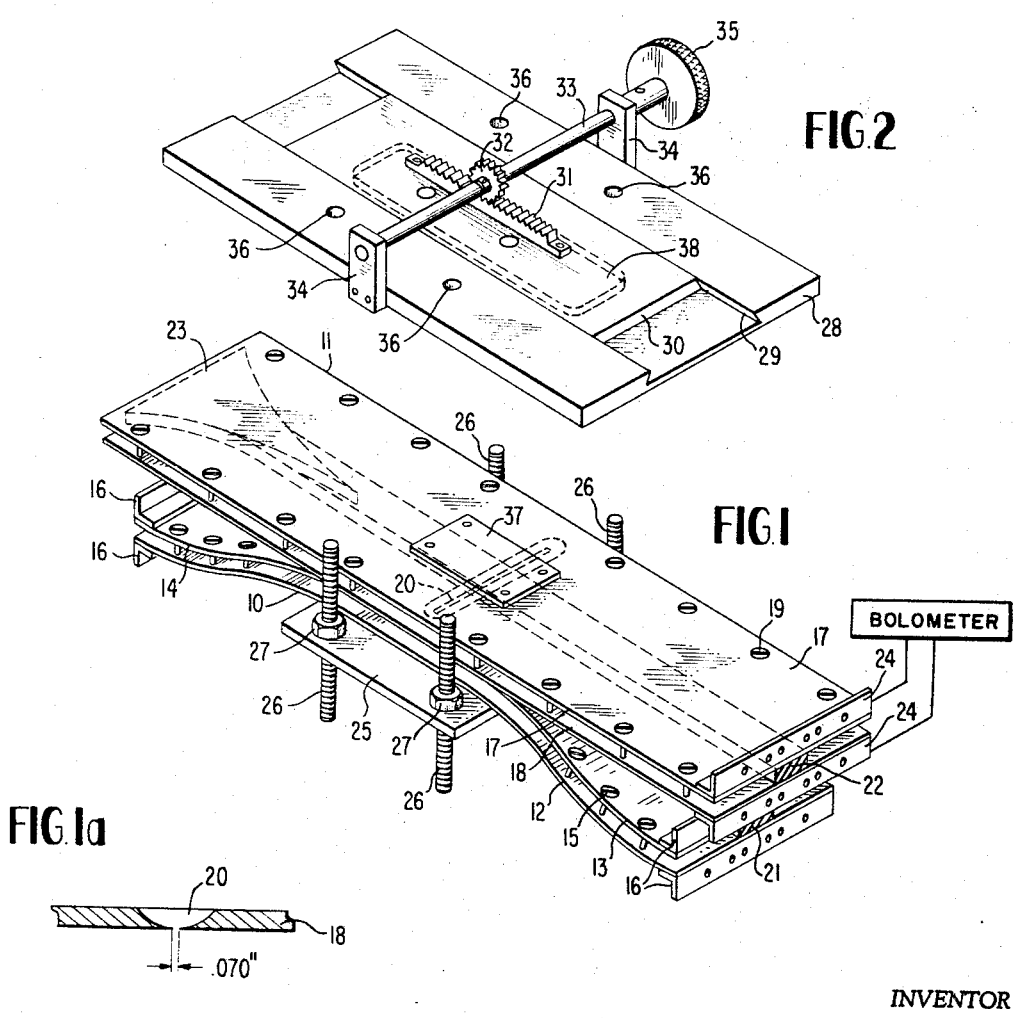

3,414,810
VOLTAGE STANDING WAVE INDICATORS FOR H-GUIDES
Leo Birenbaum, Bronx, N.Y., assignor to Polytechnic Institute of Brooklyn, Brooklyn, N.Y., a corporation of New York
Filed Sept. 17, 1965, Ser. No. 488,068
6 Claims. (Cl. 324—58)

ABSTRACT OF THE DISCLOSURE

There is disclosed by the hereinafter specification a VSWR indicating apparatus for use in and with an H-guide microwave transmission system. The apparatus generally comprises a pair of superposed H-guide sections including means for electrically coupling the H-guide sections together. Mechanical means are disclosed for moving one H-guide section relative to the other section for the purpose of changing the position of the electrical coupling between the guide sections. The indicating apparatus is provided with means for coupling it into an H-guide transmission system and to an energy indicating device such as a bolometer.

---

This invention relates to voltage standing wave indicators for H-guides.

The prior art relating to voltage standing wave indicators has been concerned with measuring VSWR in rectangular wave guides. That art does show structural details that are geometrically similar to the wave guide of the present invention. The patents to A. T. Nordsieck, U.S. 2,571,055, issued Oct. 9, 1951, and S. Hopfer, U.S. 2,989,699, issued June 20, 1961, are exemplary of the prior art as it pertains to rectangular wave guides and voltage standing wave ratio indicators. Generally speaking, the prior art discloses a section of rectangular wave guide having a longitudinal section deleted from the upper broad wall of the wave guide and having a movable wall, including a transverse slit completely covering the spacing in the upper broad wall of the main guide section. The prior art also discloses a section of rectangular wave guide mechanically coupled to and covering the slit in the movable wall and being end-fed from the main guide section. A bolometer or other energy indicating device is generally connected to the other end of the wave guide section for the purpose of indicating the VSWR.

The prior art devices are wholly inadequate for the purpose of measuring the voltage standing wave ratio in H-guides, and these inadequacies are due to the inherent differences between an H-guide and a rectangular wave guide. It has always been assumed that if a slot is cut into a wave guide for the purposes of inserting a probe to measure the voltage standing wave ratio, that the probe should be inserted at that point where the electric field is strongest and further it should be inserted in the direction of the electric field. On this subject, see generally the text by Brown, Sharpe, and Hughes, "Lines, Waves and Antennas," published by the Ronald Press Company in 1961 at page 171. The devices referred to in the above-noted patents utilize the principles taught by Brown, Sharpe and Hughes.

An H-guide, on the other hand, is an electromagnetic wave guide composed of a pair of longitudinally extending conductive plates or strips arranged parallel of each other and spaced apart by a distance that is smaller than the width of the plates; a dielectric strip, utilized for wave guiding purposes, is located between the plates and extends longitudinally along the center lines of the plates. The H-guide is excited with electromagnetic energy in a mode that has its principal electric vector parallel to the plates. For further information on the H-type waveguides, see articles by F. J. Tischer, "The H-Guide, A Waveguide for Microwaves," published in IRE Convention Record, 1956, part 5, pages 44 to 47; and "H-Guide—A new Microwave Concept" in Electronic Industries & Tele-Tech, vol. 15, No. 11, for November, 1956, pages 50, 51, 130, 134 and 136.

The prior art devices are ineffective when applied to the problem of measuring the VSWR in an H-guide in that the art has always taught the concept of inserting the VSWR probe in parallel to the vector lines of the electric field. The logical extension of the prior art to H-guides would involve the insertion of a probe into the open side of the H-guide in that the electric field in an H-guide is perpendicular to these openings. The openings in the sides of the H-guide correspond roughly to the broad walls of a rectangular waveguide. Likewise, the broad walls of the H-guide correspond roughly to the narrow walls of a rectangular waveguide. All attempts to measure VSWR by inserting a probe, using the teachings of the prior art, into the openings between the broad walls of the H-guide have proved unsuccessful.

Furthermore, it was necessary with VSWR indicators, as illustrated in the prior art, to lap or polish the upper surface of the broad wall in the rectangular guide and lower surface of the sliding wall to insure good electrical contact in that conduction currents flowing in the interior surfaces of the rectangular waveguide had to cross all contact surfaces. The practice of polishing or lapping conducting surfaces is unnecessary in the H-guide in that current flow is completely transverse to the direction of the propagation of the electromagnetic fields or the direction of power transmission. Thus, it is unnecessary to plate and highly polish any contact surfaces in the invention described below.

Accordingly, it is the primary object of this invention to provide a voltage standing wave ratio detector for an H-guide.

It is a further object of this invention to provide a VSWR indicator for an H-guide that can be utilized in an operational system without greatly affecting the parameters of the working system.

It is still a further object of this invention to provide a VSWR indicator for an H-guide system that is sturdy and compact in construction and inexpensive to manufacture.

The foregoing as well as other objects of the invention are achieved by a voltage standing wave indicator which is composed of two sections of H-guides one on top of the other where the lower section is connected for microwave transmission into the main waveguide system. The microwave transmitting section of H-guide, in the preferred embodiment of this invention, consists of a bottom conductive broad wall rigidly affixed in parallel to two portions of an upper wall where these two sections are spaced apart from one another so as to define a longitudinally extending gap in the upper wall. The second H-guide is movably stacked upon the wave transmission section, and it is in electrical communication with the transmissing guide to provide an indication of the VSWR. For this purpose, the upper or measuring H-guide's bottom broad wall is a common wall to both H-guides. The common wall is provided with a transverse slot where the slot is positioned in the longitudinal gap in the lower waveguide. Thus, the upper or measuring H-guide derives a portion of the energy in the transmitting H-guide at any position along the longitudinally extending gap.

The achievement of the foregoing objects as well as other objects and advantages of the invention will become more apparent from the following detailed description and as shown in the drawing wherein:

FIGURE 1 is a perspective view of the two H-guide sections showing the sliding broad wall, transverse slot, and matched load;

FIGURE 1a is a longitudinal sectional view of a portion of wall 18 at the location of the coupling slot; and FIGURE 2 is a perspective view of the driving mechanism for moving the energy measuring H-guide section over the energy transmitting H-guide section.

Referring to FIGURE 1, a VSWR indicator for H-guides is shown as consisting of a lower microwave transmission H-guide section 10 and an upper power derivation H-guide section 11. The H-guide 10 consists of a curved longitudinally extending bottom broad wall 12 of electrically conductive material and a pair of curved spaced apart upper portions of a broad wall 13 and 14. The upper portions of the broad wall 13 and 14, hereinafter referred to as the plates 13 and 14, are also made of electrically conductive material; they are spaced apart from one another by a longitudinally extending gap and are held in rigid parallel spaced apart relationship to the broad wall 12 by spacers 15 which may be conductive or insulative. The spacers 15 have their ends located in holes spaced along the edge of each broad wall and hold the conductive plates spaced apart by a distance that is considerably smaller than the width of the plates. The plates 12, 13 and 14 are curved so as to laterally displace the longitudinal gap existing between the plates 13 and 14 from the direction of propagation of microwave energy. The lateral displacement of the H-guide 10 was found to be convenient for facilitating the transfer of energy to the H-guide 11 and for accommodating the lower broad wall of the guide 11 to the guide 10.

The plates 12, 13 and 14 are provided at their extreme ends with L-shaped flange members 16 for attaching the H-guide 10 to other sections, not shown, of the microwave transmission circuit.

The H-guide 11 consists of a pair of parallel spaced apart longitudinally extending conductive plates 17 and 18. The plates 17 and 18 are spaced apart by a plurality of suitable means such as spacers 19 having their ends located in holes spaced along both edges of each plate. The spacing members 15 and 19 may be of metal or of any suitable rigid dielectric material. In the preferred embodiment of this invention, they are made of brass.

The H-guide is supported relative to the H-guide 10 so that the lower wall 18 of the H-guide 11 occupies and covers the longitudinally extending space existing between the plates 13 and 14 and thus forms a common wall to both H-guide 10 and H-guide 11.

The plate 18 is provided with a U-shaped slot 20 for coupling energy from guide 10 into guide 11. The slot 20 is cut transversely to the direction of propagation of microwave energy in guide 10 and is oriented parallel to the electric field vectors in guide 10. As shown in FIG. 1a, the width of the slot varies from its narrowest point at the apex of the U located in the lower face of plate 18, and thus in the longitudinally extending gap between plates 13 and 14, to its widest point in upper face of plate 18. The width of the slot to be utilized in any particular embodiment of this invention will be a function of the wave length of power being transmitted and of the other parameters of the waveguide, and in particular, it will be a function of the distance separating the upper and lower broad walls of the H-guide 10 as will be apparent to those skilled in the art. The H-guide 11 is mounted for relative movement with respect to H-guide 10 and is provided with a driving mechanism, to be hereinafter described, for moving it longitudinally with respect to H-guide 10. Thus, the slot 20 is capable of being moved to any desired position in the gap existing between plates 13 and 14.

A dielectric strip 21 extends along the longitudinal centerline of the H-guide 10 for the entire length of the waveguide section and is positioned between the plates 12, 13 and 14 and that part of broad wall 18 that fills the gap between plates 13 and 14. A second dielectric strip 22 extends longitudinally along the centerline of the guide 11. The strip 22 is positioned between the plates 17 and 18. The strips 21 and 22 may be made from various dielectric materials including polystyrene, polyethylene and epoxy resins. For the purposes of this invention, it is preferred to use a cellular dielectric material obtained commercially under the name Polyfoam. Such foams may be made from polystyrene, polyethylene or epoxy resins. For foam materials, the width of the strips preferably will be larger than the spacing between the upper and lower plates of each guide section but this is not necessary. If the width is smaller than the distance between the plates, then the plates must be made very much wider. For solid dielectric materials, the width of the strip will be very much smaller than the distance separating the plates.

The H-guide 11 is terminated in a matched load 23. The load 23 is made out of a foam material having high loss properties so as to prevent reflections from the loaded end of the H-guide section. It is located between the plates 17 and 18 and is anchored in the dielectric strip 22. The load 23 may consist of various shapes and in the preferred embodiment of the invention, the load 23 was tapered from a broad base located at one end of the guide 11 down to a sharp apex terminating in the dielectric strip 23 and pointing down the centerline of the H-guide 11. It will be appreciated by those skilled in the art that the proper choice of a matched load for any given VSWR indicator will be determined by the physical properties of the waveguide chosen for any particular wave length being studied. The plates of the H-guide 11 are provided with L-shaped flanges 24 at one end for the purpose of attaching a conventional power measuring device such as a bolometer to the guide section 11.

As has been stated heretofore, the upper guide section 11 must be mounted and supported so as to have the ability to move longitudinally along the lower guide section 10 in order to obtain a measurement of the voltage standing wave ratio of standing waves in section 10, that is to say, the slide must move or have the ability to move from maximums to minimums and vice versa as they are represented by standing waves in the guide section 10.

In the preferred embodiment of the present invention, the guide sections 10 and 11 are shown stacked one on top of the other and supported on a flat rectangular plate 25 where the plate 25 is provided with a plurality of spaced holes drilled through it for the purpose of accommodating a plurality of platform posts 26. The posts 26 may be provided with threads to accommodate lugs 27 for the purpose of aligning and leveling the lower guide section 10 with respect to the circuit to which it is to be attached.

Referring now to FIGURE 2, an upper stacking plate 28, rectangular in shape and made out of a light weight material such as aluminum is shown provided with a groove 29 along the longitudinal centerline throughout the length of the plate 28. A slide 30 is supported by the plate 28 within the groove 29 for movement along the length of the plate. The slide 30 supports a conventional rack 31 where the rack 31 is oriented to engage a pinion 32 so as to move the slide in the groove 29. The pinion 32 is supported for rotation on a shaft 33 where the ends of the shaft 33 are mounted for rotation in posts 34. The posts 34 are secured in parallel relation to the plate 28. A turning knob 35 may be affixed to the shaft 33.

The plate 28 is provided with a plurality of spaced apart holes 36 for mounting the plate in stacked relation and on top of the H-guide sections 10 and 11. The plate 28 is secured through the holes 36 to the posts 26 and is secured so as to bring the plate 18 in firm contact with the tapered end portions of plates 13 and 14 of the H-guide sections.

The outer face of the upper wall 17 of the guide 11 supports a rectangular anchor plate 37. This plate may be rigidly affixed to the slide 30 in any well known manner. In the preferred embodiment of this invention, the plate 28 is provided with a central cavity 38 into which the plate 37 is fitted and attached by conventional screws to the slide 30. It will thus be obvious that since the H-guide 11 is rigidly attached to the slide 30 movement of the knob 35 will change the longitudinal position of the coupling slot 20 in the gap existing between the plates 13 and 14 of H-guide 10; therefore, the field established in the H-guide 10 may be sampled at any point in the gap and the sample may be read out at the output of H-guide 11 to give an indication of the VSWR in the H-guide 10.

A preferred embodiment of the invention has been shown and described, but obvious changes could be made in this embodiment, e.g., the H-guide 11 may be oriented for end feeding with respect to the H-guide 10 without departing from the scope of the invention as defined in the accompanying claims.

I claim:
1. A microwave VSWR indicator for an H-guide comprising:
    a first H-guide section having a longitudinally extending conductive bottom plate and a pair of longitudinally extending conductive top plates, said top plates being affixed in parallel to said bottom plate and separated from said bottom plate by a distance smaller than the width of said plates, said top plates being mounted in a spaced apart relationship to each other so as to define a longitudinally extending gap in said first H-guide section;
    a dielectric strip position between the top and bottom plates of said first H-guide section and extending longitudinally along the centerline of said plates, said dielectric strip constituting the wave-guiding element of said H-guide section;
    a second H-guide section having a pair of longitudinally extending conductive plates arranged in parallel relation so as to define a top plate and a bottom plate and spaced apart by a distance smaller than the width of said plates, said bottom plate being provided with a transversely extending slot;
    a dielectric strip positioned between the top and bottom plates of said second H-guide section and extending longitudinally along the centerline of said plates; said dielectric strip constituting the wave-guiding element of said second H-guide section, said dielectric strip being terminated at one end in a dummy load having microwave resistance properties;
    means for supporting said second H-guide section on said first H-guide section so that said slot in the bottom wall of said second section is positioned in the longitudinally extending gap of said first section, said bottom wall of said second section being in contact with the top plates of said first section so as to define a common wall of said H-guide sections;
    means mounted on said second H-guide section for moving said second section in longitudinal direction relative to said first H-guide section; and
    said second H-guide section being provided with means for mounting an energy detector thereto such that an indication of the power level in said second section may be provided where the energy level in said second section is a function of the VSWR in said first H-guide section.

2. A microwave VSWR indicator for an H-guide according to claim 1 wherein said dummy load comprises a lossy member of microwave dissipating material, said member being tapered in shape, the base of the dummy load being located at the end of said second H-guide section and the apex being located in said dielectric strip on the centerline.

3. A microwave VSWR indicator for an H-guide according to claim 1 wherein the end portions of said first H-guide section are offset laterally from the end portions of said second H-guide section.

4. A microwave VSWR indicator for an H-guide according to claim 1 wherein said means for mounting said second guide section on said first guide section comprises a support plate having a plurality of holes therethrough for supporting said first and second H-guide sections in stacked relationship; a retaining plate mounted on the top wall of said second H-guide section and having a plurality of holes therethrough in axial alignment with said holes in said support plate; a plurality of posts threaded through said holes, and clamping means mounted on said posts for holding said sections and plates in fixed vertical alignment.

5. A microwave VSWR indicator for an H-guide according to claim 1 wherein said means for moving said second guide section over said first guide section comprises a rack and pinion assembly.

6. A microwave VSWR indicator for an H-guide comprising:
    a first H-guide section having means for connecting said section in a microwave circuit;
    a second H-guide section mounted on said first H-guide section and having means for electrically coupling said second section to said first section;
    means for mechanically moving said second H-guide section on said first H-guide section so as to vary the point of electrical coupling between said sections; and
    energy detector means connected to said second H-guide section for measuring the power level in said H-guide section to thereby provide an indication of the VSWR in said first H-guide section.

References Cited
UNITED STATES PATENTS

| | | | |
|---|---|---|---|
| 2,580,678 | 1/1952 | Hansen et al. | 324—58 |
| 2,654,863 | 10/1953 | Riblet | 324—58 |
| 2,702,884 | 2/1955 | Riblet. | |
| 2,776,406 | 1/1957 | Cohn et al. | 324—58 X |
| 2,788,445 | 4/1957 | Murray et al. | |
| 2,901,709 | 8/1959 | Fitzmorris | 333—84 X |
| 2,976,497 | 3/1961 | Watts | 324—58 X |

RUDOLPH V. ROLINEC, *Primary Examiner.*

P. F. WILLE, *Assistant Examiner.*